US005539642A

United States Patent [19]

Wiel

[11] Patent Number: 5,539,642

[45] Date of Patent: Jul. 23, 1996

[54] FUZZY LOGIC AUTOBRAKE SYSTEM FOR AIRCRAFT

[75] Inventor: Colin T. Wiel, Bellevue, Wash.

[73] Assignee: The Boeing Company, Seattle, Wash.

[21] Appl. No.: 472,945

[22] Filed: Jun. 6, 1995

Related U.S. Application Data

[62] Division of Ser. No. 65,976, May 21, 1993.

[51] Int. Cl.[6] .................................................. B60T 13/10

[52] U.S. Cl. ................ 364/426.01; 395/900; 244/110 R; 303/126

[58] Field of Search ......................... 364/426.01, 426.02, 364/426.03, 428; 395/900, 905; 244/110 R, 111, 110 A; 303/91, 93, 95, 97, 99, 100, 103, 125, 126, 177

[56] References Cited

U.S. PATENT DOCUMENTS

| | | | |
|---|---|---|---|
| 3,920,278 | 11/1975 | Hirzel et al. | 303/93 |
| 3,926,479 | 12/1975 | Bissell et al. | 244/111 |
| 4,076,331 | 2/1978 | DeVlieg | 303/93 |
| 4,327,413 | 4/1982 | Ruof | 364/426.02 |
| 4,610,484 | 9/1986 | Amberg et al. | 303/100 |
| 4,646,242 | 2/1987 | Valaas | 364/426.02 |
| 4,809,175 | 2/1989 | Hosaka et al. | 395/900 X |
| 4,842,342 | 6/1989 | Takahashi et al. | 303/103 X |
| 5,024,490 | 6/1991 | Pease, Jr. et al. | 303/93 |
| 5,136,510 | 8/1992 | Beck | 364/426.01 |

*Primary Examiner*—Collin W. Park
*Attorney, Agent, or Firm*—Conrad O. Gardner

[57] ABSTRACT

A system for automatically controlling the braking of an aircraft to a desired setting upon landing or during a rejected takeoff. The inputs to the control system are airplane acceleration and airplane pitch. The output from the control system is an electric current which is sent to a hydraulic servo valve. This valve meters hydraulic pressure to the brakes.

1 Claim, 6 Drawing Sheets

Fig. 3A.
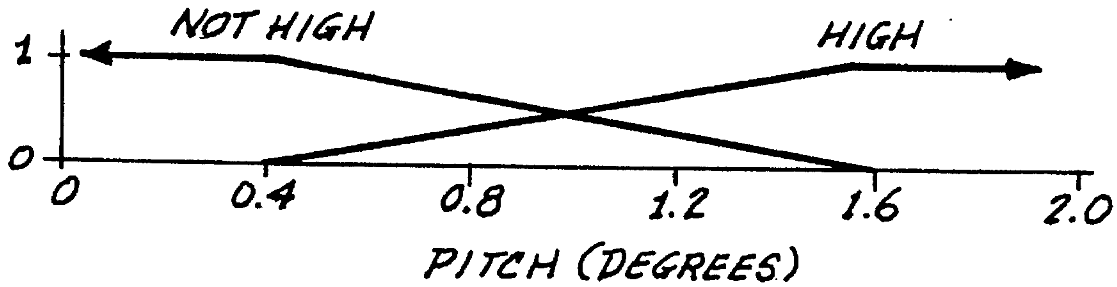
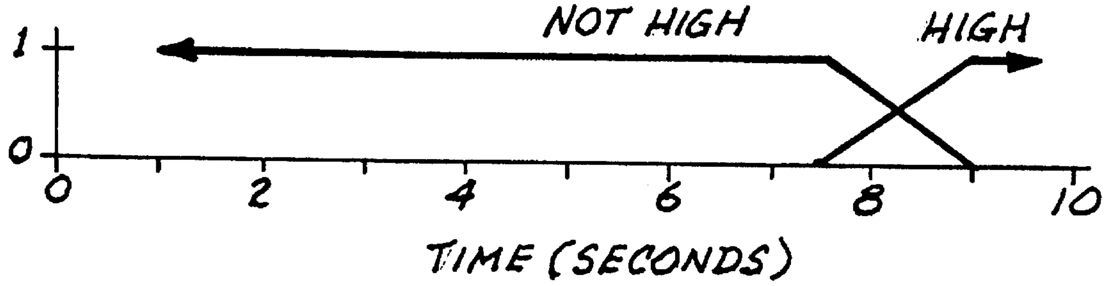
Fig. 3B.

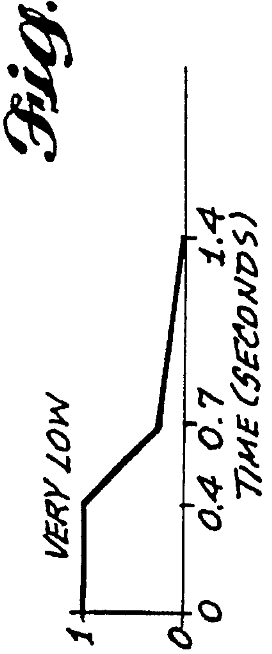
Fig. 4D.
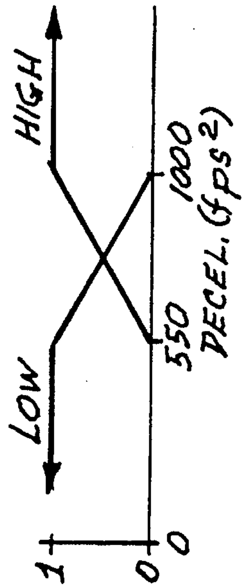
Fig. 4E.
Fig. 4A.
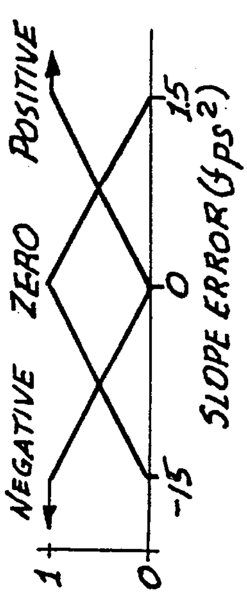
Fig. 4B.
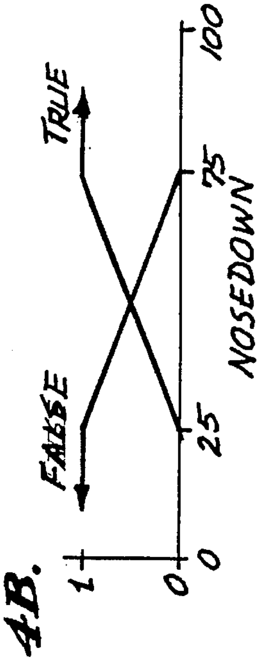
Fig. 4C.
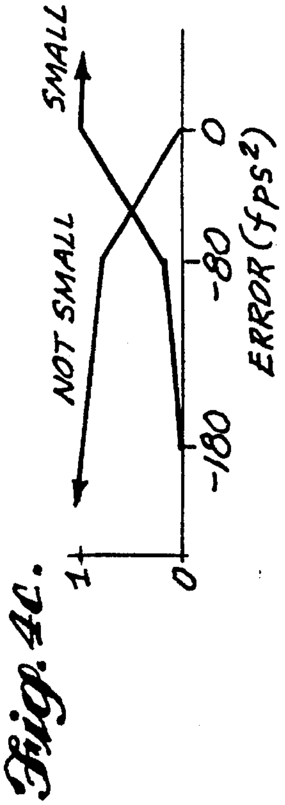

FUZZY LOGIC AUTOBRAKE SYSTEM FOR AIRCRAFT

This application is a divisional of the application Ser. No. 08/065,976, filed on May 21, 1993, still pending.

BACKGROUND OF THE INVENTION

The present invention relates to autobrake systems for aircraft, and more particularly to fuzzy logic utilized for improved control of aircraft autobrake systems.

Fuzzy logic as applied to control systems is exemplified in the patent literature by, e.g., U.S. Pat. No. 4,842,342 to Takahashi, et al., which describes a vehicle antiskid system (i.e., a system used to control braking on a single wheel in such a manner that the wheel lockup is prevented) based on fuzzy control.

Further illustrative of the use of fuzzy logic is U.S. Pat. No. 5,001,640 to Matsumoto, et al., which also describes a vehicle antiskid system. The system is also based on fuzzy inference using a pressure measurement to estimate vehicle deceleration. The system uses a combination of vehicle deceleration, wheel velocity, and wheel deceleration as a basis for control.

In contrast to the aforementioned U.S. Pat. No. 4,842,342 and 5,001,640, the present control objective is different, viz., automatic application and control to a constant deceleration, as opposed to preventing wheel lockup and optimizing braking force. Also, in the present invention, membership functions and rule bases are different.

SUMMARY OF THE INVENTION

It is an object of this invention to provide an aircraft automatic braking system utilizing fuzzy logic to provide smoother braking on-ramp and tighter control to the steady-state set point.

The present invention uses fuzzy logic to automatically control the braking of an airplane to a desired setting upon landing or during an RTO rejected takeoff. The inputs to the control system are airplane acceleration and airplane pitch. The output from the control system is an electric current which is sent to a hydraulic servo valve. This valve meters hydraulic pressure to the brakes. The control logic is based on a set of rules which are vague, i.e., fuzzy. The rule base is evaluated in parallel each decision cycle. First, a weight is assigned to each rule based on how applicable the rule is at the given point in time. The output is then calculated using these weights by taking the weighted average of all of the rules. Important features of the present system are that fuzzy logic is applied to aircraft brakes and that two separate rule bases are actually used, one to provide on-ramp braking, and the other to provide steady-state braking. A supervisory mixing module determines how much weight is given to each of the two rule bases.

BRIEF DESCRIPTION OF THE DRAWINGS

FIG. 3A is a graph illustrative of the nosedown fuzzy set for pitch angle in degrees.

FIG. 3B is a graph illustrative of nosedown fuzzy set for time in seconds.

FIGS. 4A, 4B, 4C, 4D, and 4E are on-ramp fuzzy sets for slope error, nosedown, error, time, and decel, respectively.

DETAILED DESCRIPTION OF THE INVENTION

Introduction

Figure 1:
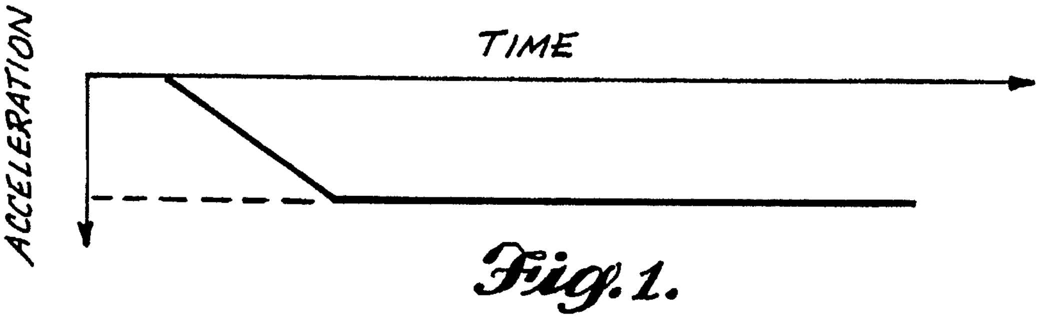
FIG. 1 is a graph illustrative of desired aircraft deceleration during autobrake stop.

The present autobrake system controls the amount of electric current sent to an electronic servo valve, which in turn meters hydraulic pressure to the brakes of the airplane. The deceleration rate of the airplane and the pitch angle of the airplane are inputs to the control algorithm. The objective is to decelerate the airplane at a constant, pilot-selected deceleration (decel) rate, and to provide a smooth on-ramp to that decel rate (FIG. 1 ).

Currently existing systems serve this objective, but not perfectly. The present fuzzy system yields smoother braking and has been shown by comparison, as hereinafter illustrated, to yield both a smoother on-ramp, and tighter control to the steady-state set point.

Description of Fuzzy Inference Engines

Figure 2:
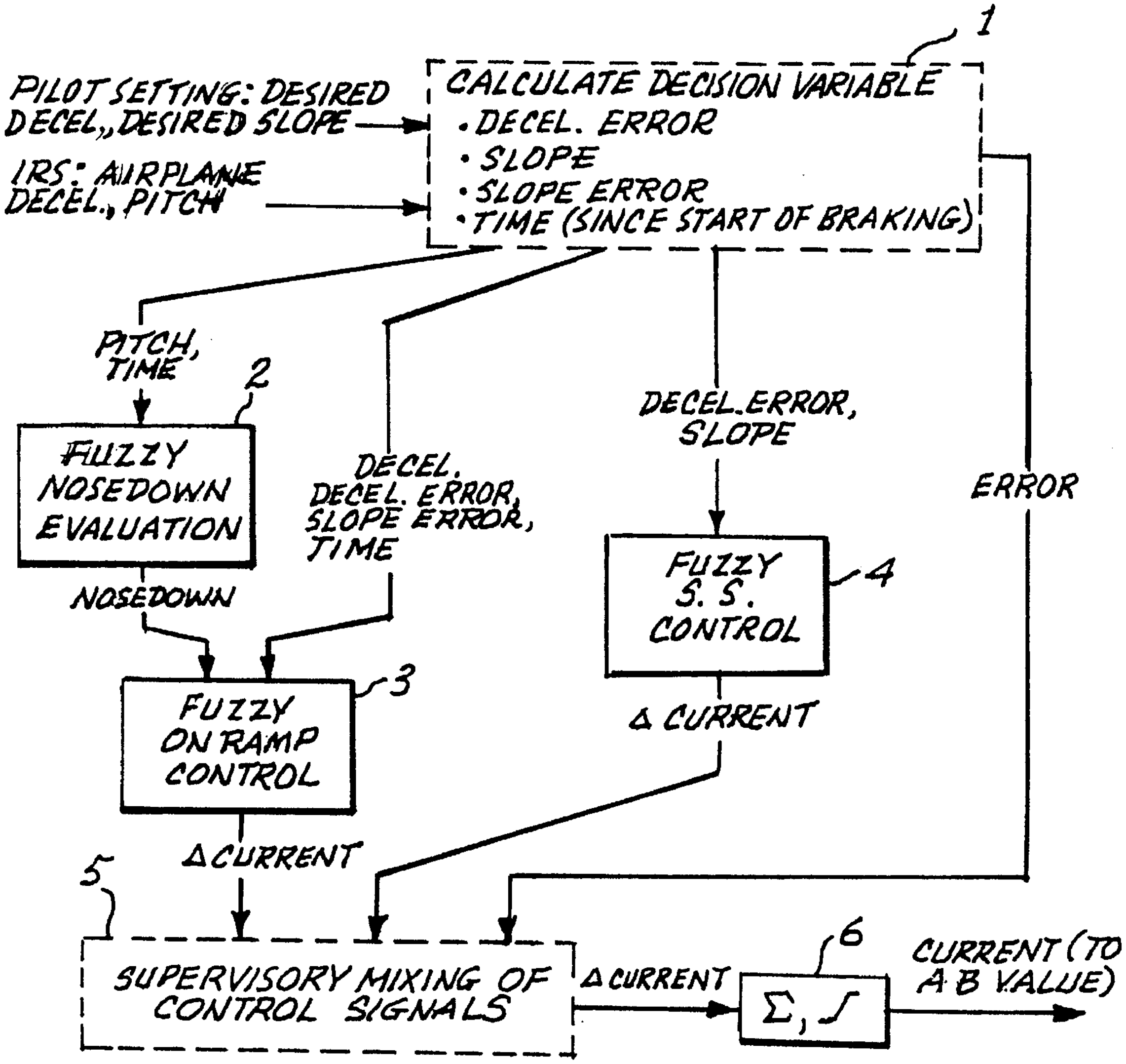
FIG. 2 is illustrative of the components of the present fuzzy autobrake algorithm.

Three fuzzy inference engines are used in the present system (FIG. 2). Each takes a multiple inputs, $x_1$ through $x_n$, and calculates a single output, y. The fuzzy inference engine is a rule-based system of the following form:

$R_1$: If $x_1$ is $A_{11}$ AND $x_2$ is $A_{12}$ and . . . $x_n$ is $A_{1n}$ THEN $y$ is $B_1$ $R_2$: If $x_1$ is $A_{21}$ AND $x_2$ is $A_{22}$ and . . . $x_n$ is $A_{2n}$ THEN $y$ is $B_2$

. . .

$R_m$: If $x_1$ is $A_{m1}$ AND $x_2$ is $A_{m2}$ and . . . $x_n$ is $A_{mn}$ THEN $y$ is $B_m$ Here $A_{ij}$s are fuzzy sets, and the Bis are scalar values. A fuzzy set is a set which allows membership values in the [0,1] interval. A fuzzy set is defined on a universal set by a membership function which maps all elements of the universal set to the [0,1] interval:

$$\mu A_{ij}(x):X\rightarrow[0,1].$$

The "AND" logical operators in these rules can be replaced with "OR" logical operators. The rule base is processed in parallel each time an inference is made. This process occurs in two steps:

Step 1: The weight (firing strength) of each rule is determined.

Step 2: Using these weights, the weighted average is taken of the outputs of each rule to determine the inference engine output, y.

The weight of a rule is determined as:

$$W_i=\mu A_{i1}(x_1)\hat{}\mu A_{i2}(x_2)\hat{}\ldots\hat{}\mu A_{in}(x_n) \quad (1)$$

where the term "^" represents the minimum operator. If "OR" is used instead of "AND", then the maximum operator replaces the corresponding minimum operator in (1).

The inference engine output, y, is calculated as follows:

$$y=\frac{\Sigma W_i \times B_i}{\Sigma W_i}$$

Description of the Present Fuzzy Autobrake Algorithm

The present Fuzzy Autobrake Algorithm consists of an initial open loop brake fill region (which consists of a current spike) followed by a closed loop algorithm. The closed loop algorithm, which executes with a 10 ms frame time, can be broken into 6 components (FIG. 2).

1. Component to Calculate Decision Variables;
2. Nosedown Evaluation Fuzzy Inference Engine;
3. On-ramp Fuzzy Inference Engine;
4. Steady State Fuzzy Inference Engine;
5. Supervisory Mixing Component;
6. Summing and Limiting Component. Each component will be described as follows:

Component 1: Component to Calculate Decision Variables.

This component receives airplane decel and pitch as inputs, as well as the desired decel and desired on-ramp slope corresponding to the pilot's selection of the autobrake switch. It then calculates decel error, slope, slope error, and time, which are defined as follows:

decel error=actual decel—desired decel slope=rate of change of decel (numerical approximation)

slope error=desired on-ramp slope—actual slope time=time elapsed since completion of brake fill spike.

Component 2: Nosedown evaluation Fuzzy Inference Engine (FIGS. 3A and 3B where the nosedown sealers are down =0 and up =100)

This component receives pitch and time as inputs, and calculates the value of "nosedown," which can take values from 0 to 100. Nosedown represents the degree to which the nose of the airplane should be considered to be down, with 0 representing definitely not down and 100 representing definitely down. The two rules and four fuzzy set values are listed below.

Nosedown Rules:

1. If Pitch Is Not High OR Time is High THEN Nosedown=Down
2. If Pitch Is High AND Time Is Not High THEN Nosedown=Up Component 3: On-ramp Fuzzy Inference Engine (The on-ramp fuzzy sets are shown in FIGS. 4A, 4B, 4C, 4D, and 4E)

This component receives decel, decel error, slope error, time, and nosedown as inputs, and calculates a value of Δcurrent (in 100,000ths of a mA). The 17 rules are as follows and the 10 fuzzy sets are shown in the Figures:

On-ramp Rules:

1. If Slope Error Is Negative AND Decel Is Low AND Nosedown Is False THEN Δ Current Is 50.
2. If Slope Error Is Negative AND Decel Is Low AND Nosedown Is False THEN Δ Current Is 120.
3. If Slope Error Is Negative AND Decel Is High AND Nosedown Is False THEN Δ Current Is 250.

4. If Slope Error Is Negative AND Decel Is High AND Nosedown Is True THEN Δ Current Is 1600.
5. If Slope Error Is Zero AND Decel Is Low AND Nosedown Is False THEN Δ Current Is 40.
6. If Slope Error Is Zero AND Decel Is Low AND Nosedown Is True THEN Δ Current Is 80.
7. If Slope Error Is Zero AND Decel Is High AND Nosedown Is False THEN Δ Current Is 200.
8. If Slope Error Is Zero AND Decel Is High AND Nosedown Is True THEN Δ Current Is 800.
9. If Slope Error Is Positive AND Decel Is Low AND Nosedown Is False THEN Δ Current Is 30.
10. If Slope Error Is Positive AND Decel Is Low AND Nosedown Is True THEN Δ Current Is 40.
11. If Slope Error Is Positive AND Decel Is High AND Nosedown Is False THEN Δ Current Is 150.
12. If Slope Error Is Positive AND Decel Is High AND Nosedown Is True THEN Δ Current Is 300.
13. If Time Is Very Low THEN Δ Current Is 0.
14. If Error Is Small AND Decel Is Low AND Slope Error Is Negative THEN ΔCurrent Is 0.
15. If Error Is Small AND Decel Is Low AND Slope Error Is Zero THEN ΔCurrent Is 100.
16. If Error Is Small AND Decel Is Low AND Slope Error Is Positive THEN ΔCurrent Is 200.
17. If Error Is Small AND Decel Is High THEN Δ Current Is 0.

Figure 5A:
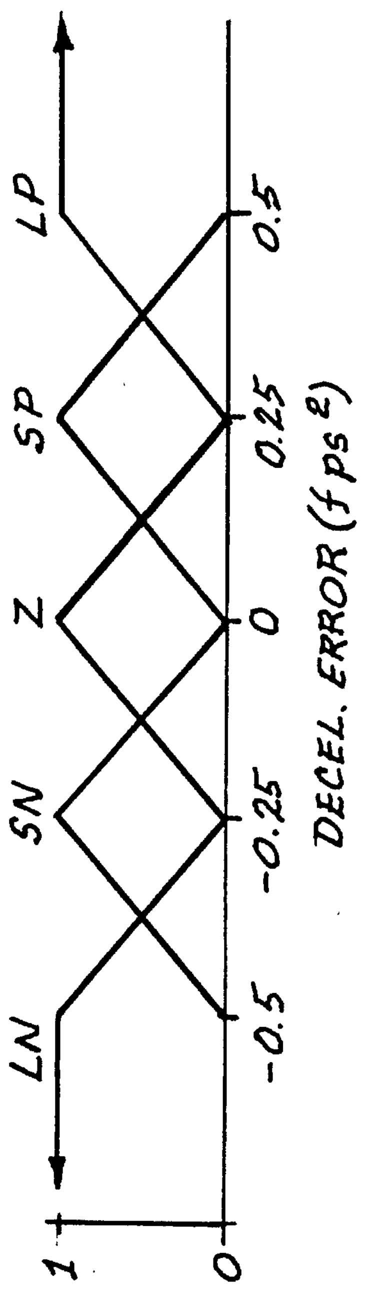
FIGS. 5A and 5B are steady-state fuzzy sets for decel error and slope, respectively.
Figure 5B:
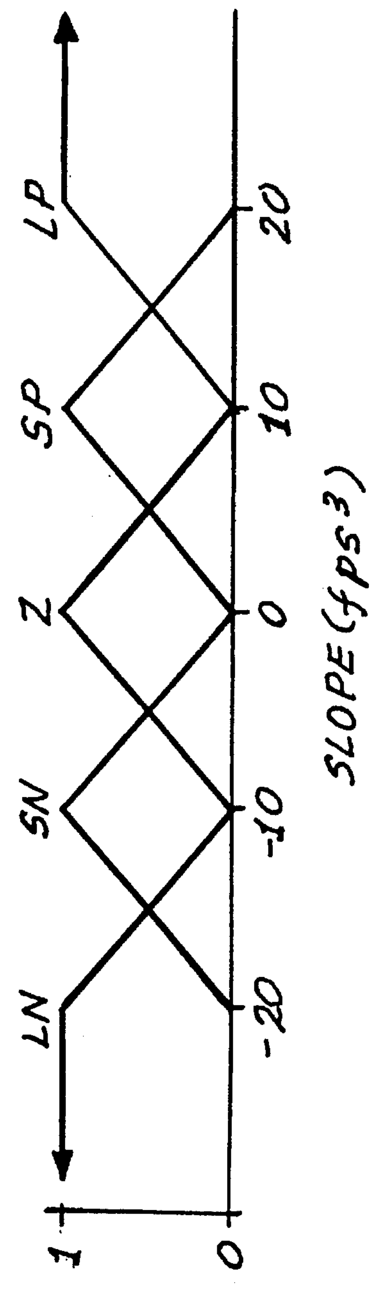

Component 4: Steady State Fuzzy Inference Engine (the steady state fuzzy sets are shown in FIGS. 5A and 5B where:

| Δ Current Scalars: | | | | | | |
|---|---|---|---|---|---|---|
| PVB | = 4200 | PVS | = 160 | NS | = −700 |
| PB | = 2600 | Z | = 0 | NM | = −1400 |
| PM | = 1400 | NVS | = −160 | NB | = −2600 |
| S | = 700 | | | NVB | = −4200 |

This component receives decel error and slope as inputs, and calculates a value of Δ current (in 100,00ths of a mA). The 25 rules are listed below and the 10 fuzzy sets are shown in the Figures.

Steady State Rules:

1. If Decel Error Is Negative Large AND Slope Is Negative Large THEN Δ Current Is Positive Very Big.
2. If Decel Error Is Negative Large AND Slope Is Negative Small THEN Δ Current Is Positive Big.
3. If Decel Error Is Negative Large AND Slope Is Zero THEN Δ Current Is Positive Medium.
4. If Decel Error Is Negative Large AND Slope Is Positive Small THEN Δ Current Is Positive Very Small.
5. If Decel Error Is Negative Large AND Slope Is Positive Large THEN Δ Current Is Zero,
6. If Decel Error Is Negative Small AND Slope Is Negative Large THEN Δ Current Is Positive Big.
7. If Decel Error Is Negative Small AND Slope Is Negative Small THEN Δ Current is Positive Small.
8. If Decel Error Is Negative Small AND Slope Is Zero THEN Δ Current Is Positive Very Small,
9. If Decel Error Is Negative Small AND Slope Is Positive Small THEN Δ Current Is Zero.
10. If Decel Error Is Negative Small AND Slope Is Positive Large THEN Δ Current Is Negative Very Small, 11. If Decel Error Is Zero AND Slope ! s Negative Large THEN Δ Current Is Positive Small
12. If Decel Error Is Zero AND Slope Is Negative Small THEN Δ Current Is Positive Very Small.
13. If Decel Error Is Zero AND Slope Is Zero THEN zero Current Is Zero,
14. If Decel Error Is Zero AND Slope Is Positive Small THEN Δ Current Is Negative Very Small,
15. If Decel Error Is Zero AND Slope Is Positive Large THEN zero Current Is Negative Small,
16. If Decel Error Is Positive Small AND Slope Is Negative Large THEN ΔCurrent Is Positive Very Small,
17. If Decel Error Is Positive Small AND Slope Is Negative Small THEN ΔCurrent Is Zero.
18. If Decel Error Is Positive Small AND Slope Is Zero THEN Δ Current Is Negative Very Small.
19. If Decel Error is Positive Small AND Slope Is Positive Small THEN Δ Current Is Negative Small,
20. If Decel Error Is Positive Small AND Slope Is Positive Large THEN Δ Current Is Negative Big.
21. If Decel Error Is Positive Large AND Slope Is Negative Large THEN Δ Current Is Zero.
22. If Decel Error Is Positive Large AND Slope Is Negative Small THEN Current Is Negative Very Small.
23. If Decel Error Is Positive Large AND Slope Is Zero THEN Δ Current Is Negative Medium.
24. If Decel Error Is Positive Large AND Slope Is Positive Small THEN ΔCurrent Is Negative Big.
25. If Decel Error Is Positive Large AND Slope Is Positive Large THEN ΔCurrent Is Negative Very Big.

Component 5: Supervisory Mixing Component

This component receives as inputs the Δ current from the On-ramp component, the Δ current from the Steady State Component, and the decel error, and calculates the Δ current by which the current will actually be increased.

This calculation is a linear transition from On-ramp control to Steady State (S.S.) control as the decel error passes from less than −0.5 fps$^2$ to 0; i.e.,

| | |
|---|---|
| Δ Current(out) | |
| ● Current(On-ramp) | if decel error < −0.5 |
| ● (−1 × decel error/0.5) × Δ Current(On-ramp) | + |
| ((decel error + 0.5)/0.5) × Δ Current(S.S.) | if −0.5 < decel error < −0.5 |
| ● Δ Current(S.S.) | if decel error > 0 |

In addition, the portion of control given to the S.S. component is held to a minimum of the highest value that it has attained so far. This means that the portion of control given to the S.S. component can never decrease, and that once the decel error reaches zero, all control will be from the S.S. component.

Component 6: Summing and Limiting Component

This component receives Δ current as an input, and calculates the current. The new current is equal to the previous current plus Δ current, limited to a minimum and maximum value.

Test Results

Figure 6A:
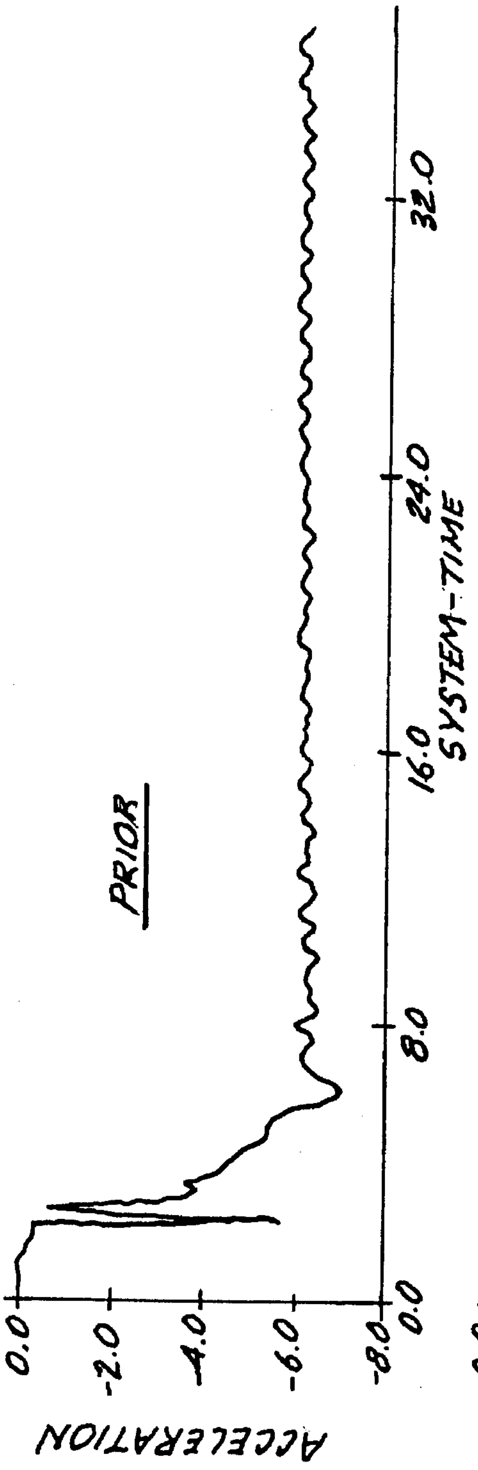
FIGS. 6A and 6B are comparative results on a simulator of prior and fuzzy autobrake systems, respectively, with an autobrake setting of 6.3 ft/sec/sec deceleration without aircraft thrust reverser deployment; and, FIGS. 7A and 7B are comparative results on a simulator of prior and fuzzy autobrake systems, respectively, with an autobrake setting of 8.5 ft/sec/sec deceleration with aircraft thrust reversers deployed.
Figure 6B:
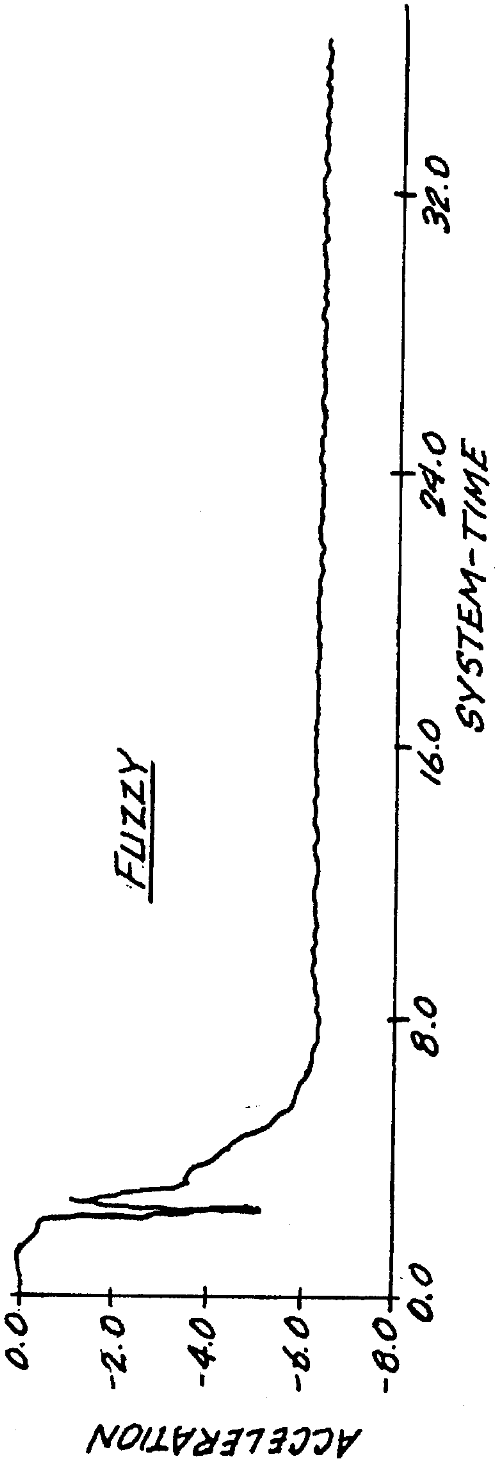

In brake control simulation test runs on a high speed, high integrity simulation of aircraft and tire-ground interface, the present fuzzy logic aircraft automatic brake control system was tested against a prior autobrake system, and the comparative results are shown in FIGS. 6A and 6B using an autobrake setting of 6.3 ft/sec/sec deceleration without thrust reversers of the aircraft deployed.

Figure 7A:
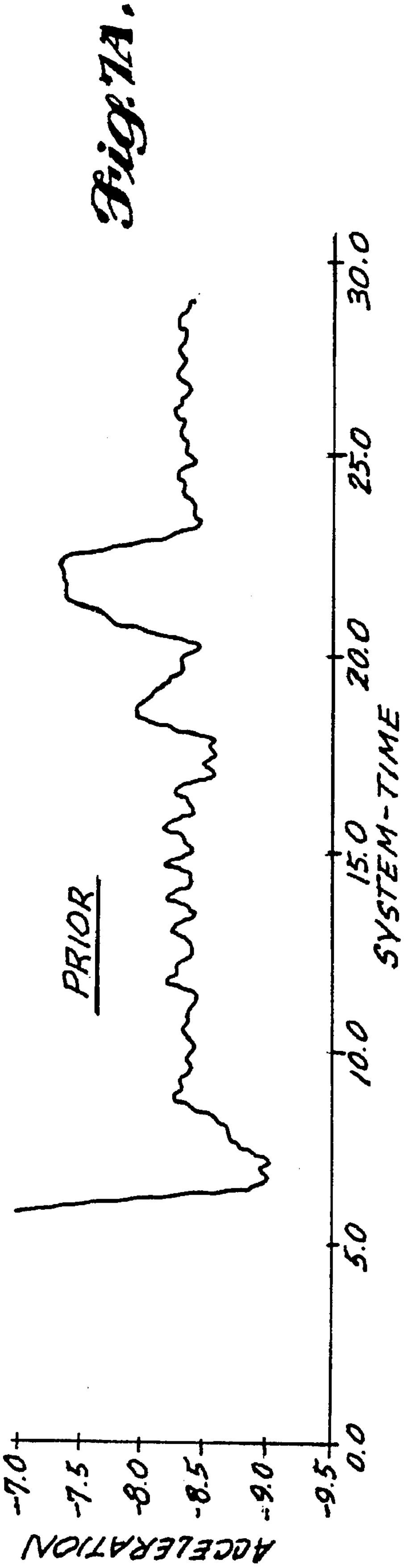
Figure 7B:
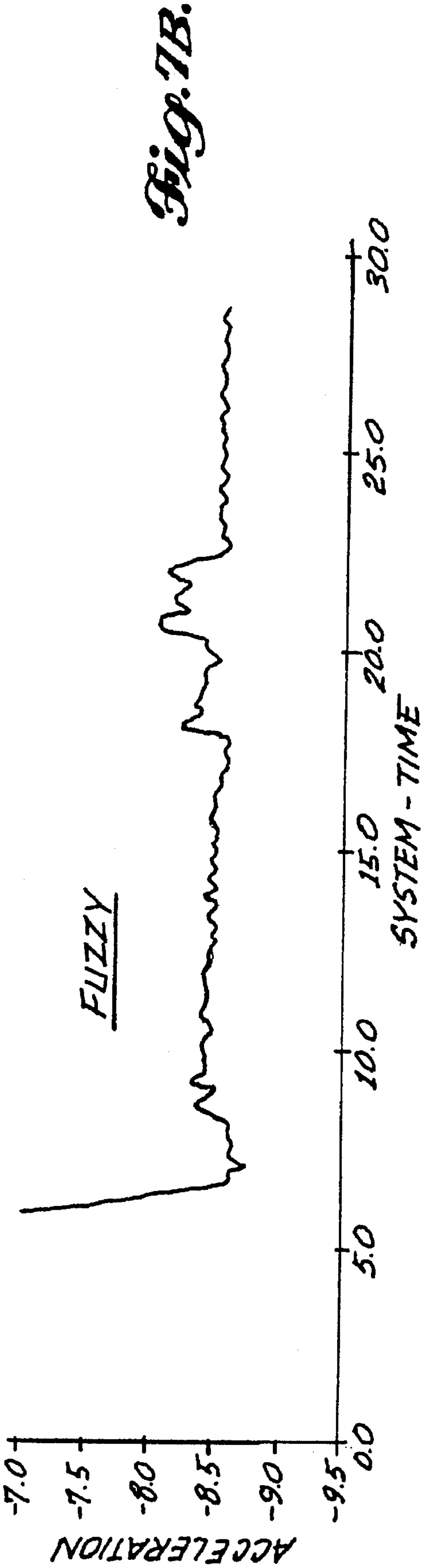

FIGS. 7A and 7B show a comparison where the autobrake setting is 8.5 ft/sec/sec deceleration with aircraft thrust reversers deployed.

Testing of the present fuzzy logic aircraft automatic braking control system against the prior system show comparative results in which in every test run, the present fuzzy logic automatic braking system out-performed the prior system without fuzzy logic in terms of smoothness and in terms of ability to hold the set point, even in the presence of thrust reverser deployment and stow.

In the actual design implementation, the aircraft ARINC 629 (Primary Controller) operates in C-Mode, and receives the "Minor Frame Synch" Pulse (MIFS) from external logic; i.e., from the Auxiliary Controller. The control of the XPP addresses are accomplished by external logic other than Primary ARINC 629 Controller. The XPP addresses of the Primary are ignored.

SUMMARY

The present control logic is based on a set of rules which are vague, i.e. fuzzy. One example rule from the system is "If the Decel Error is Large Negative, and the Slope [Derivative of Decel Error] is Positive Small, then the Δ Current is Positive Very Small." Here, "Large Negative," "Positive Small," and "Positive Very Small" are defined by mathematical functions. The rule base is evaluated in parallel each decision cycle. First, a weight is assigned to each rule based on how applicable the rule is at the given point in time. The output is then calculated using these weights by taking the weighted average of all of the rules.

Important features of the present system include:

1. A fuzzy logic is utilized in automatic braking of the aircraft.
2. The fuzzy calculation of one variable is being used in another fuzzy calculation; (i.e., "Nosedown" being used in the "On-Ramp" calculation).
3. The use of a fuzzy approach to the mixing of the outputs of more than one fuzzy system; (i.e., Supervisory Mixing of On-Ramp and Steady State outputs).
4. The use of a fuzzy system to calculate an incremental value which is then summed to provide the overall system output; (i.e., Δ Current, which is summed to determine the control output, Current).

What is claimed is:

1. In combination:

an aircraft automatic braking system for providing signals representative of deceleration error and slope;

a hydraulic servo valve for decreasing hydraulic pressure to the aircraft brakes; and, a steady state inference engine responsive to said signals representative of deceleration error and slope for providing a Δ current in 100,000ths of a milliampere; and, said Δ current in 100,000ths of a milliampere coupled to said hydraulic servo valve to control said hydraulic pressure.

* * * * *